Oct. 23, 1923.

E. PASCUCCI 1,471,804

METHOD OF MAKING MOLD PLUNGERS

Filed April 13, 1921     3 Sheets-Sheet 1

INVENTOR
Emilio Pascucci
BY
ATTORNEY

Oct. 23, 1923.  
E. PASCUCCI  
1,471,804  
METHOD OF MAKING MOLD PLUNGERS  
Filed April 13, 1921   3 Sheets-Sheet 2
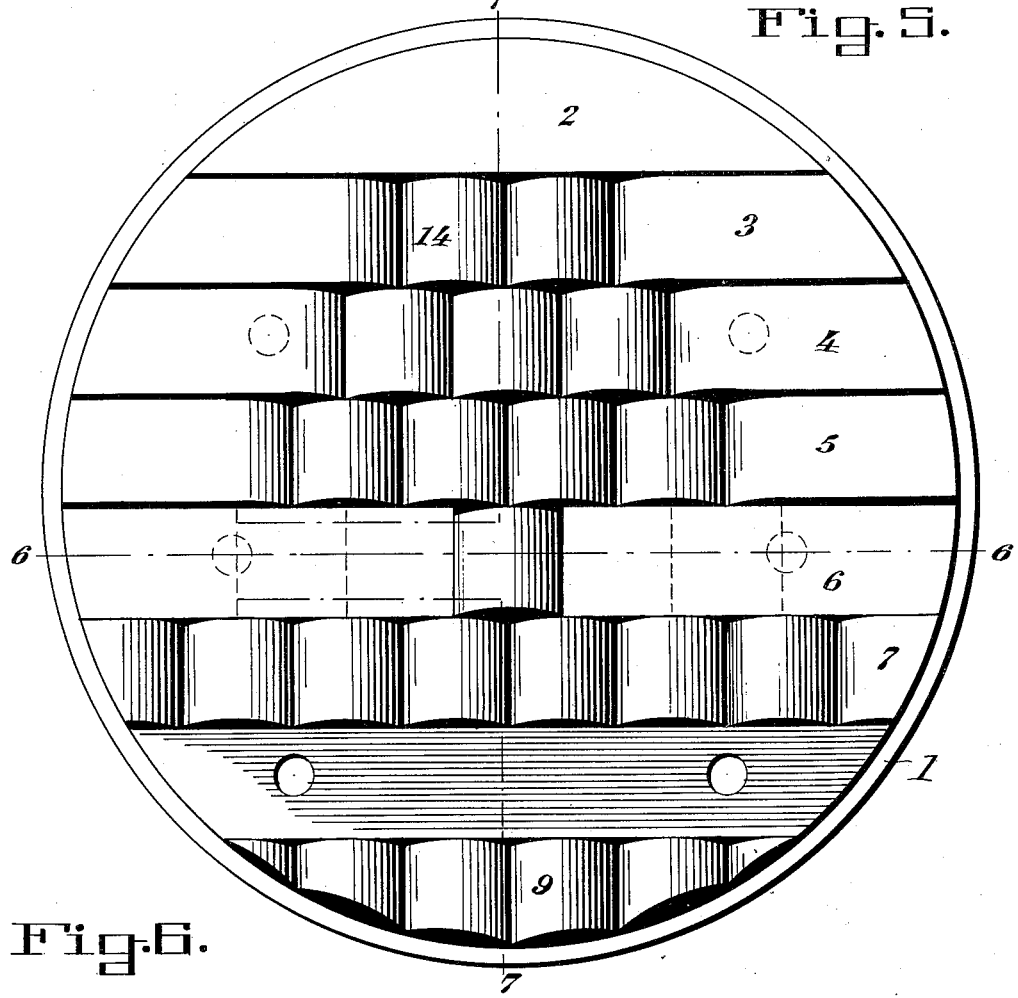
Fig. 5.
Fig. 6.
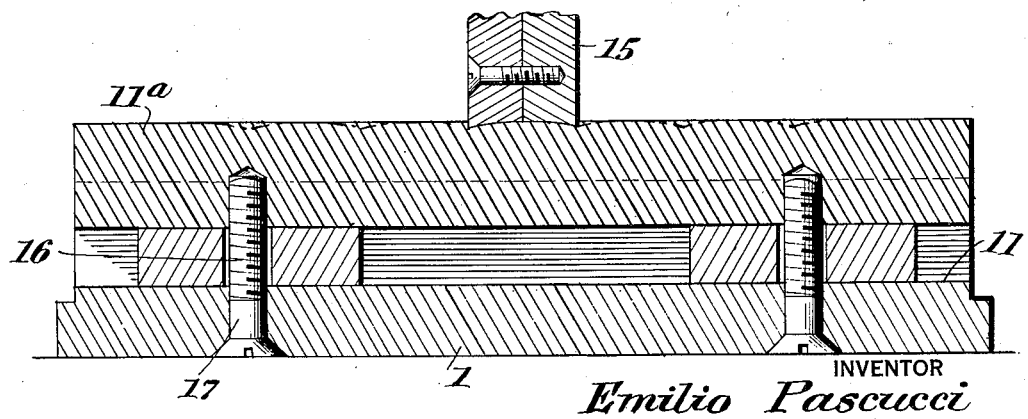
INVENTOR  
*Emilio Pascucci*  
BY  
*Dorsey Cole*  
ATTORNEY Oct. 23, 1923.

E. PASCUCCI 1,471,804

METHOD OF MAKING MOLD PLUNGERS

Filed April 13, 1921   3 Sheets-Sheet 3

INVENTOR
Emilio Pascucci
BY
Dorsey Cole
ATTORNEY

Patented Oct. 23, 1923.

1,471,804

UNITED STATES PATENT OFFICE.

EMILIO PASCUCCI, OF CORNING, NEW YORK, ASSIGNOR TO CORNING GLASS WORKS, OF CORNING, NEW YORK, A CORPORATION OF NEW YORK.

METHOD OF MAKING MOLD PLUNGERS.

Application filed April 13, 1921. Serial No. 461,067.

*To all whom it may concern:*

Be it known that I, EMILIO PASCUCCI, a citizen of the United States of America, and a resident of Corning, New York, have invented certain new and useful Improvements in Methods of Making Mold Plungers, of which the following is a specification.

This invention has for its object to provide an improved method of forming a mold plunger having ribs upon its face with abrupt end walls for the space between the ribs. Such a plunger is especially useful in pressing headlight cover glasses or the like having vertical ungulæ formed on prisms arranged across the cover glass, and the invention will be described in connection with a plunger for forming such an article. By this invention the ribs may be cut on the steps of the plunger by a milling cutter fed parallel with the ribs without damaging or otherwise destroying work previously completed, so that a plunger may be quickly and accurately formed. The invention will be hereafter fully described and claimed.

In the accompanying drawings illustrating this invention:—

Fig. 5, is a similar view, but showing the block forming one of the steps removed, and one of the removable steps only partly cut into ribs;

Fig. 6, is a cross section taken approximately on the line 6—6 of Fig. 5, and showing a milling cutter in position to form a rib;

In forming a cover glass with a smooth outer surface, and with light-refracting faces on its rear surface, it is the usual practice to form a negative design on the mold plunger, and to use a smooth bottomed mold. With these parts is used a ring adapted to be placed upon the top of the mold, and having an internal diameter of a size to snugly receive the plunger when it descends for pressing.

With the use of the above mentioned members it is possible to press a cover glass having a flange and bead for engagement with a lamp frame, the central portion of the glass having thereon a design corresponding to that formed on the plunger. It is difficult, however, to form certain designs on the plunger by milling, due to the limitations of such a process, but by the invention herein set forth these difficulties are much reduced, and the scope of the designs to which the milling process can be applied is much increased.

For the purpose of clearness, this invention will be described as forming a plunger adapted for the pressing of a cover glass comprising rows of horizontal prisms, the faces of which are inclined at an angle to the face of the glass, and which have formed thereon ungulæ extending across each prism from the top to the bottom thereof, the walls of the ungulæ being either straight or convexed in cross section, the ungulæ being parallel to the faces of the prisms on which they are formed, with the upper end of each ungula abutting against, and merging into the rib above that on which it is placed, and with its lower end terminating in a substantially flat and horizontal face. In this cover glass the ungula on each horizontal row is staggered in respect to the ungulæ in the row immediately above and below it. It will, of course, however, be understood that in describing this invention, it is not desired to limit it to a plunger for the manufacture of such a cover glass.

Figure 1:
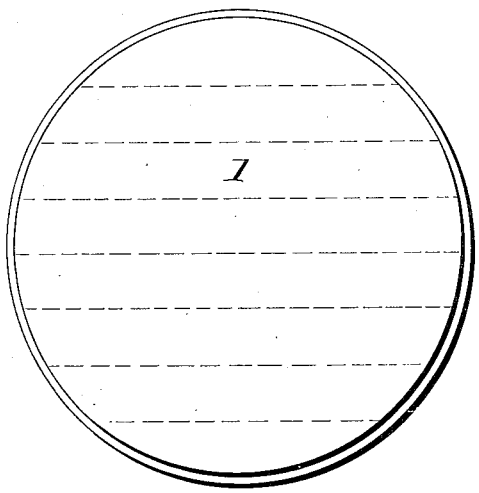
Figure 1, is a face view of a metal disk from which the mold plunger is to be formed, showing by dotted lines the horizontal steps on which the ribs are to be cut in accordance with this invention.
Figure 2:
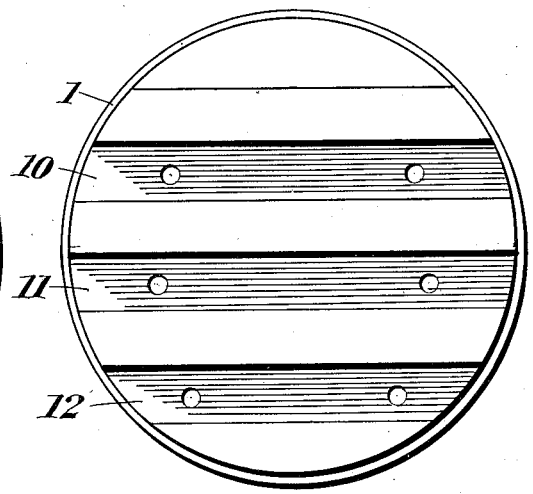
Fig. 2, is a plan view of a partly completed mold plunger.
Figure 3:
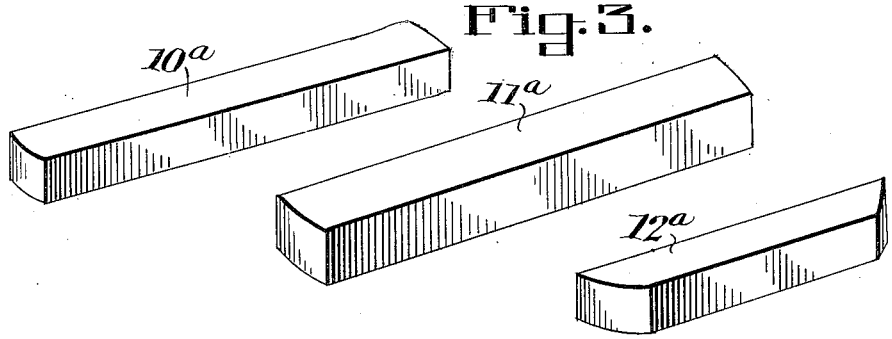
Fig. 3, is a detailed view of the removable blocks adapted to fit within the channels shown formed in the plunger of Fig. 2.
Figures 7, 8:
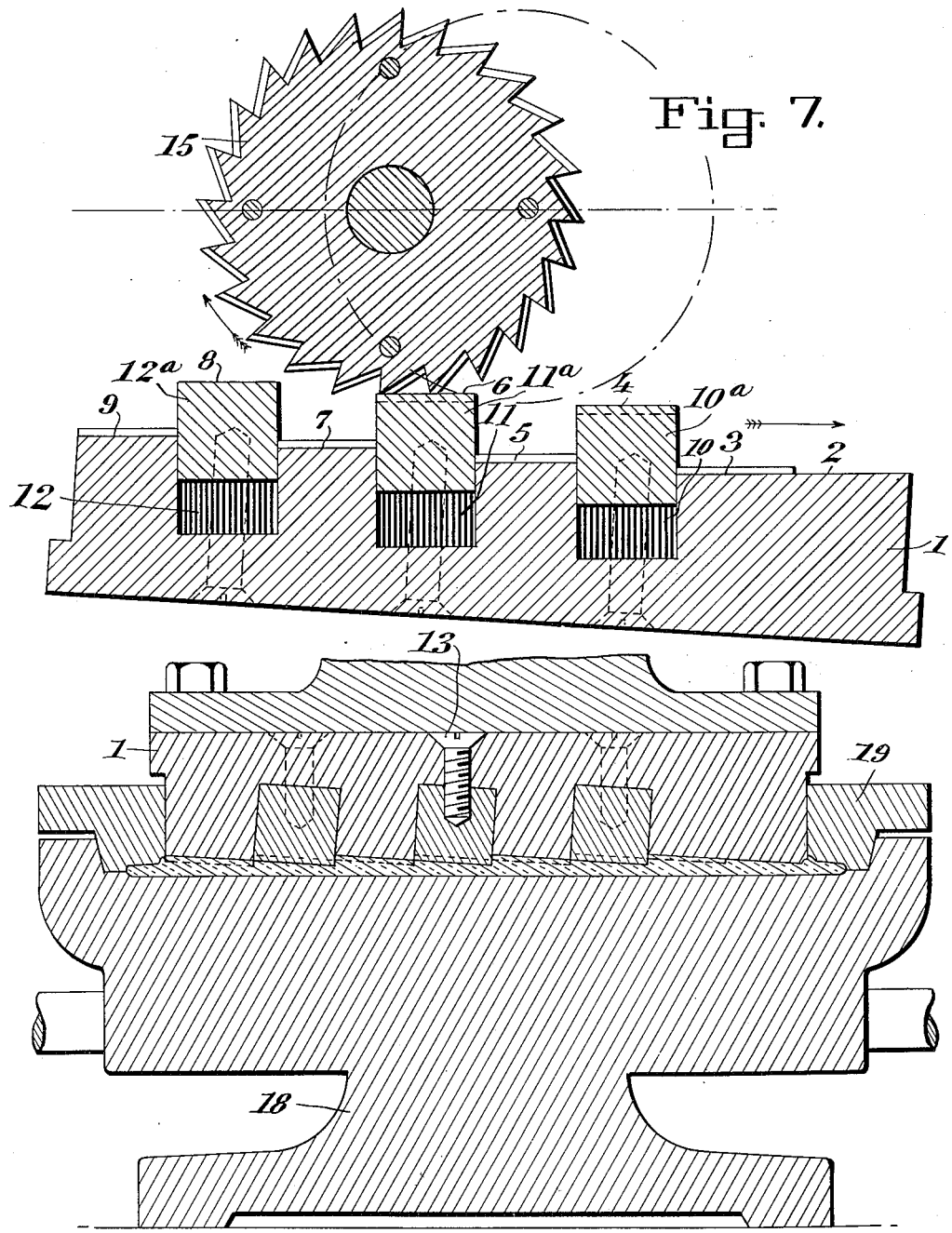
Fig. 7, is a cross section taken at right angles to Fig. 6, and on line 7—7 of Fig. 5.
Fig. 8, is a cross section through a mold and associated plunger constructed in accordance with the invention, showing the process of forming a headlight cover glass.

In carrying out this invention, a plunger 1 is first made of proper diameter, having a smooth lower face (see Fig. 1). The face is then channeled from side to side, the width of each channel, and the distance between adjacent channels, being the desired width of the corresponding horizontal prisms to be formed on the cover glass. Three such channels 10, 11, and 12, are shown in Figure 2. In these channels are seated blocks $10^a$, $11^a$, and $12^a$, which may be held in place by screws 13 (see Figure 8), entering the rear face of the blocks.

Figure 4:
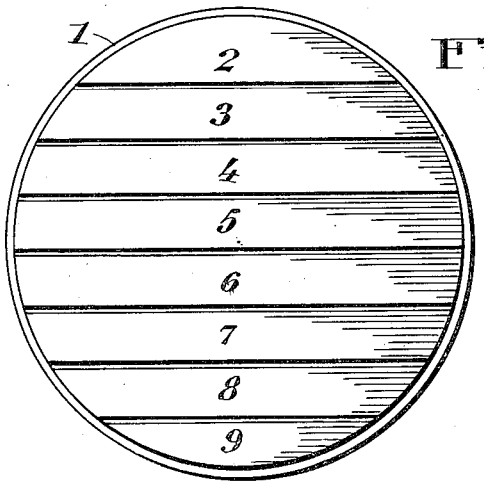
Fig. 4, is a plan view of the plunger with all the steps formed thereon, but prior to the cutting of the ribs.

The composite face of the plunger is then formed in a planing machine into a series of steps, the face of each step being inclined to the general face of the plunger, and being of a width equal to the prism on the glass to be formed thereby. Certain of the steps are each formed entirely by one of the blocks 10ª, 11ª, and 12ª, and by a space between two of the channels in which such blocks are contained. The plunger resulting from these operations is shown in Fig. 4, which illustrates one having eight steps designated by the numerals 2 to 9, inclusive, of which the steps 4, 6 and 8 are formed on the removable blocks, and steps 2, 3, 5, 7 and 9 are formed on the plunger face immediately above a channel. The word "above" has reference to the fact that the part of the glass molded by step 2 is the upper prism on the glass when in place in an automobile lamp. The inclination of the faces or steps is such that they incline upwardly away from the rear of the face of the plunger (see Fig. 7).

After the steps have been formed as described, the ribs can be cut thereon, and, for this purpose, the partly completed plunger is taken from the planer, and put in the vise of the miller. The blocks 10ª, 11ª, and 12ª having been removed, the ribs 14 are cut in the steps 3, 6, 7 and 9, by a properly shaped cutter 15, rotating around an axis at right angles to the axis of the ribs, and fed across the steps.

By preference, the bottom of the cut is made parallel to the face of each step, and no difficulty will be met with in so milling the parts, as each of such steps, except 3, has below and above it, either a channel, or the periphery of the plunger, and hence the cutter can be fed entirely through such step without interfering or damaging any adjacent step. As to step 3, it is noted that with the bottom of the recess parallel with its face, the upper ends of the cuts formed therein do not extend below the level of the face of the lower edge of the step 2, so that the cutter if properly guided and limited, does not mar the face of the last named step. As shown, no ribs are formed in the step 2.

The blocks 10ª, 11ª, and 12ª are now placed in the corresponding recesses 10, 11 and 12, being held off the bottom thereof by spacing pieces 16 (see Figures 6 and 7), and are there fastened in place by the screws 17. This raises the surfaces of such blocks above the level of the adjacent integral steps, and permits easy milling of the ribs 14 on the faces of such blocks. Such ribs having been formed the spacing pieces are removed, and the blocks fastened down in the channels by the screws 13. The plunger is now complete, and is ready for use in the manner shown in Fig. 8, in which it is shown co-operating with a mold 18, and a plunger ring 19.

Having thus described my invention what I claim as new, and desire to secure by Letters Patent is:—

1. The method of making a mold plunger having a series of steps on its face having ribs thereon, which consists in channeling the face of the plunger at points corresponding to alternate steps, cutting ribs on the metal left between adjacent channels, and inserting in the channels of the plunger blocks forming steps.

2. The method of making a mold plunger having a series of steps with ribs thereon, which consists in channeling the face of the plunger at points corresponding to alternate steps, inserting blocks in such channels, forming the faces of the blocks and the intervening portions of the plunger into a series of steps, removing the blocks, cutting ribs on the integral steps by a cutter fed transversely thereof, partly inserting each block in its channel, and forming ribs thereon and then seating the blocks in the channels.

In testimony whereof I have signed my name.

EMILIO PASCUCCI.